(12) United States Patent
McKnight et al.

(10) Patent No.: US 7,550,189 B1
(45) Date of Patent: Jun. 23, 2009

(54) VARIABLE STIFFNESS STRUCTURE

(75) Inventors: Geoffrey P. McKnight, Los Angeles, CA (US); William Barvosa-Carter, Ventura, CA (US)

(73) Assignee: HRL Laboratories, LLC, Malibu, CA (US)

( * ) Notice: Subject to any disclaimer, the term of this patent is extended or adjusted under 35 U.S.C. 154(b) by 376 days.

(21) Appl. No.: 11/193,148

(22) Filed: Jul. 29, 2005

Related U.S. Application Data

(60) Provisional application No. 60/601,300, filed on Aug. 13, 2004.

(51) Int. Cl.
  B32B 3/12 (2006.01)
  E04C 2/08 (2006.01)
  E04B 1/02 (2006.01)
  E01C 5/22 (2006.01)
  C22F 1/00 (2006.01)
  B64C 5/10 (2006.01)
  B64C 13/00 (2006.01)
  B29C 61/00 (2006.01)
  B21D 15/00 (2006.01)
  B32B 3/28 (2006.01)

(52) U.S. Cl. .......................... 428/116; 52/606; 52/561; 404/44; 148/563; 244/99.8; 264/230; 72/59; 428/163

(58) Field of Classification Search .................. 52/561, 52/606; 404/44; 244/99.8; 264/230
See application file for complete search history.

(56) References Cited

U.S. PATENT DOCUMENTS

| | | | | |
|---|---|---|---|---|
| 2,954,622 | A | * | 10/1960 | Moore ........................ 40/662 |
| 4,522,393 | A | * | 6/1985 | Dunn ......................... 273/447 |
| 6,000,660 | A | | 12/1999 | Griffin et al. |
| 6,175,170 | B1 | | 1/2001 | Kota et al. |
| 6,182,929 | B1 | * | 2/2001 | Martin et al. ............... 244/219 |
| 6,265,333 | B1 | * | 7/2001 | Dzenis et al. .............. 442/346 |
| 6,301,742 | B1 | | 10/2001 | Kota |
| 6,447,478 | B1 | * | 9/2002 | Maynard ................. 604/95.05 |
| 7,250,839 | B2 | * | 7/2007 | Racz et al. .................. 335/215 |
| 2003/0102411 | A1 | | 6/2003 | Kota |
| 2003/0234598 | A1 | * | 12/2003 | Fuller et al. ................ 310/328 |

(Continued)

OTHER PUBLICATIONS

Melek Yalcintas and Heming Dai, Magnetorheological and electrorheological materials in adaptive structures and their performance comparison, Smart Mater.Struct. 8 (1999), 560-573.

(Continued)

*Primary Examiner*—David R Sample
*Assistant Examiner*—Nicole T Gugliotta
(74) *Attorney, Agent, or Firm*—Christopher R. Balzan, Esq.

(57) ABSTRACT

In some embodiments, a variable stiffness structure is provided having constant stiffness material layers and variable modulus material layers arranged in alternating layers. The variable modulus material layers have a material with a changeable elastic modulus in response to an applied energy field so as to allow reversible coupling and decoupling of stress transfer between successive layers of the constant stiffness material layers to provide a change in a bending stiffness of the variable stiffness structure. The constant stiffness material layers may include segmented portions. The constant stiffness material layers may have segmented portions arranged such that successive layers of the plurality of constant stiffness material layers have overlapping segmented portions. The variable modulus material layers may have shaped structures, for example, corrugation, pillars, striations, tubular, or honeycomb configurations.

19 Claims, 7 Drawing Sheets

U.S. PATENT DOCUMENTS

2003/0235460 A1    12/2003    Moon et al.
2004/0197519 A1*    10/2004    Elzey et al. .................. 428/68

OTHER PUBLICATIONS

Melek Yalcintas and John P. Coulter, Electrorheological material based non-homogeneous adaptive beams, Smart Mater. Struct. 7 (1998), 128-143.

Erik Abrahamson, Mark Lake, Naseem Munshi, Ken Gall, Shape memory Polymers for Elastic Memory Composites, 43rd Structures, Structural Dynamics, and Materials Conference, Apr. 22-25, 2002, Denver, Colorado, AIAA 2002-1562; pp. 1-11.

David Cadogan, Stephen Scarborough, John Lin, George Sapna, III, Shape Memory Composite Development for Use in Gossamer Space Inflatable Structures, 43rd AIAA/ASME/ASCE/AHS/ASC Structures, Structural Dynamics, and Materials Conference & Exhibit, Apr. 22-25, 2002, Denver, Colorado, 2002-1372; pp. 1-11.

Will Francis, Mark Lake, Kaushik Mallick, Gregg Freebury, Arup Maji, Development and Testing of a Hinge/Actuator Inforporating Elastic Memory Composites, 44th Structures, Structural Dynamics, and Materials Conference, Apr. 7-10, 2003, Norfolk, Virginia AIAA 2003-1496; pp. 1-14.

Mark Lake, Fred Beavers, The Fundamentals of Designing Deployable Structures with Elastic Memory Composites, 43rd Structures, Structural Dynamics, and Materials Conference, Apr. 22-25, 2002, Denver, Colorado, AIAA 2002-1454; pp. 1-10, 12-13.

Mark Lake, Naseem Munshi, Michael Tupper, Troy Meink, Application of Elastic Memory Composite Materials to Deployable Space Structures, AIAA Space 2001 Conference and Exposition, Aug. 28-30, 2001, New Mexico, AIAA 2001-4602; pp. 1-10.

C. Liang, C.A. Rogers, E. Malafeew, Investigation of Shape Memory Polymers and Their Hybrid Composites, Journal of Intelligent Material Systems and Structures, vol. 8 -Apr. 1997, 380-386.

Douglas Campbell, Arup Maji, Deployment Precision and Mechanics of Elastic Memory Composites, 44th Structures, Structural Dynamics, and Materials Conference, Apr. 7-10, 2003, Norfolk, Virginia AIAA 2003-1495.

Mark S. Lake, Naseem A. Munshi, Michael L. Tupper, Troy Meink, Application of Elastic Memory Composite Materials to Deployable Space Structures, AIAA Space 2001 Conference and Exposition, Aug. 28-30, 2001, Albuquerque, New Mexico AIAA 2001-4602.

Mark S. Lake, Fred L. Beavers, The Fundamentals of Designing Deployable Structures with Elastic Memory Composites, 43rd Structures, Structural Dynamics, and Materials Conference, Apr. 22-25, 2002, Denver, Colorado AIAA 2002-1454.

* cited by examiner

VARIABLE STIFFNESS STRUCTURE

CROSS REFERENCE TO RELATED APPLICATIONS

This application claims the benefit of U.S. Provisional Application No. 60/601,300, by McKnight et al., entitled VARIABLE STIFFNESS STRUCTURE, filed Aug. 13, 2004, herein incorporated by reference in its entirety.

BACKGROUND

The field of adaptive structures has evolved the integration of actuation and sensing elements into structures so that the response of the system to external stimuli may be altered. Current state of the art generally involves attaching an "active material" component to a structural member composed of a linear elastic material such as aluminum or polymer matrix fiber composites. In such an arrangement the active material component can responsively and adaptively actuate the linear elastic material in response to external stimuli. Active material components are those belonging to a category of materials that change their shape or stiffness in response to an external control field. Some examples include piezoelectric, magnetostrictive, and shape memory alloy materials. Linear elastic materials are those belonging to a category of materials where the strain and stress experienced during deformation are linearly related, and upon relief of stress, all deformation is removed.

While utility may be obtained using active materials incorporated with linear elastic materials, significant change in shape and form of the structural component is hampered by the use of linear elastic materials. These materials present a sub-optimal design choice for the design of large changes in structural shape. In one case, the structural components can be designed such that stiffness and strength are low, but the overall deformation is large. In another approach the structure may be designed such that the system exhibits high stiffness, but as a result the reversible deformation capability of the structure is limited and large amounts of energy are required to affect a change in the geometry, along with a significant support structure to maintain the deformation. In addition, these materials cannot accomplish significant "Gaussian Curvature" or simultaneous curvature about two orthogonal axes because this requires a change in area in the plane of the deformation. Typical linear elastic materials are severely limited in their capability for changing area.

The capability for structural components to achieve large changes in shape would be greatly enabled by materials that can reversibly change their elastic stiffness. By changing elastic stiffness, the energy required for deformation can be decreased. Further advantages would result from a material, which in a lowered stiffness state could undergo large reversible deformation in at least one direction. Given these properties, it would be possible to consider making large changes in the shape of high-stiffness structural components. While this property is currently available using polymers, especially shape memory polymers, these materials possess low elastic stiffness and thus are generally not preferred for structural components.

Current structure design using static component shapes often requires compromise between various operational conditions rather than optimization over a range of conditions. If an intermittent change in structure is required, for example in the reconfiguring of an aircraft wing from a take-off or landing configuration to a cruising configuration, current solutions require extra components and added complexity is incurred. This problem is not limited to aerospace but is common to a myriad of technologies, such as for example automotive, space, telecommunications, medical, optical, or other technologies where structural or surface reconfiguration is desirable.

Other important areas where a change in stiffness is desirable include storage and deployment of expandable structures. Current methods rely heavily on complicated assemblies of rigid parts that make use of traditional mechanical components (pivots, latches, etc.). Deployable devices using variable stiffness structures would enable new designs to be considered, with fewer parts and assembles, thus reducing weight and complexity.

U.S. Pat. No. 6,000,660 by Griffin, et al., herein incorporated by reference, describes a variable stiffness member which changes its stiffness by rotating an elliptical shaft, thereby changing the bending stiffness according to the change in height and width of the elliptical cross section. This concept is limited in the total change in stiffness achievable, and it is not nearly as robust as a material that exhibits intrinsic change in stiffness. In addition, this approach is not applicable to creating stiffness changes or structural shape changes in large planar surface components.

Fibrous elastic memory composite materials utilizing carbon fibers and a shape memory polymer matrix can change their elastic stiffness. Details of this approach are outlined by Campbell and Maji, in the publication "Deployment Precision And Mechanics Of Elastic Memory Composites", presented at the 44$^{th}$ Annual AIAA Structures, Structural Dynamics and Materials Conference, Norfolk, Va., Apr. 7-10, 2003. The limitation of these materials comes from the use of fibers as the reinforcement agent, which undergo microbuckling in order to achieve high compressive strain. The mechanical properties of the composite material once microbuckling has been initiated are significantly reduced as compared to the initial aligned fiber direction. In addition, the process of microbuckling can be difficult to control in terms of the direction of microbuckling (i.e., in-plane or out of plane). Another important limitation of these materials, in the case of deforming surfaces, is a limitation in the amount of area change (simultaneous strain in two orthogonal directions) that can be achieved due to the inextensibility and length of the reinforcing fibers.

Another approach intended to serve the same role as these materials, in the specific case of morphing structures, are termed compliant structures. Compliant structures employ a specific architecture that tailors deflection along a desired contour when subject to known input forces and deflections. While this approach is advantageous in some applications, it is generally limited in the number of configuration states that can be achieved and optimized. Therefore, it is not as effective when more than one pre-specified range of motion is desired.

In some applications what is needed is a structure capable of changing bending stiffness in response to a control signal such that the stiffness may be decreased, the material reshaped, and the stiffness returned after reshaping. In certain applications, what is needed is a structure that allows a change in material stiffness to permit a change in the shape and function of a structural or surface component. Further, in some applications, what is needed is a structure that exhibits increased axial stiffness. In some applications, what is needed is a structure whose resonant frequencies may be altered by changing the intrinsic structural stiffness. In still other applications, what is needed is a structure that permits single components to serve multiple roles at reduced overall complexity and weight. In yet other applications, what is needed is large reversible change in surface area of structural materials.

SUMMARY

In some embodiments, a variable stiffness structure is provided having constant stiffness material layers and variable modulus material layers. The variable modulus material layers are arranged in alternating layers with the constant stiffness layers. The variable modulus material layers have a material with a changeable elastic modulus in response to an applied energy field so as to allow reversible coupling and decoupling of stress transfer between successive layers of the constant stiffness material layers to provide a change in a bending stiffness of the variable stiffness structure.

In certain embodiments, the constant stiffness material layers include segmented portions. In some embodiments, each of the constant stiffness material layers have segmented portions arranged such that successive layers of the plurality of constant stiffness material layers have overlapping segmented portions.

In certain embodiments, the variable modulus material layers have shaped structures. For example, the variable modulus material layers may include corrugation, pillars, striations, tubular, or honeycomb configurations.

In certain embodiments, the constant modulus material layers have shaped structures. For example, the constant modulus material layers may include corrugation or striation.

BRIEF DESCRIPTION OF THE DRAWINGS

The features and advantages of the present invention will be better understood with regard to the following description, appended claims, and accompanying drawings where:

DESCRIPTION

Recently, developments in structural component design include integration of so-called active materials into active or adaptive structures. Active materials encompasses a broad class of materials, but for the sake of this description are described as materials whose mechanical properties may be altered via the application of a field (electric, magnetic, thermal, chemical) which leads to certain types of functionality. For example, shape memory materials are one class of active materials that may recover a memorized shape by applying given thermal conditions to the material. This effect may be used in many different manners, including performing work, or reversibly absorbing mechanical energy.

One class of shape memory materials called shape memory polymers or SMP exists which possess many novel properties. The basic behavior of SMP materials can be understood by thinking of two polymers with different glass transition temperatures that have been intimately combined, yet maintain their separate properties. This mixture results in several phenomena. The first is a large change in the elastic properties (stiffness) over a narrow temperature region (the transition temperature). Below the transition temperature, the polymer has a relatively high elastic stiffness, predominately due to one of the polymer species. Above the transition temperature (which may be thought of as the glass transition temperature of the first polymer component), the modulus is drastically reduced, resulting primarily from the second polymer species. This change in mechanical stiffness is a useful property that may be exploited in some embodiments of the present invention.

Another property that can be achieved with this structure is recovery of a set shape from an arbitrary shape upon heating above the transition temperature. A related effect is termed shape fixity and refers to the ability to deform the material above the transition temperature, cool under constraint, and then hold the shape without constraints once below the transition temperature. Due to this property, the material is useful as a shape changing material, where various shapes are introduced at high temperature, and then maintained at low temperature. While previous devices have used this effect, the relatively low magnitude of the elastic stiffness of the polymer species prevent this material from being used in certain structural applications requiring high elastic stiffness.

EMBODIMENTS OF THE VARIABLE STIFFNESS STRUCTURE

Figure 1:
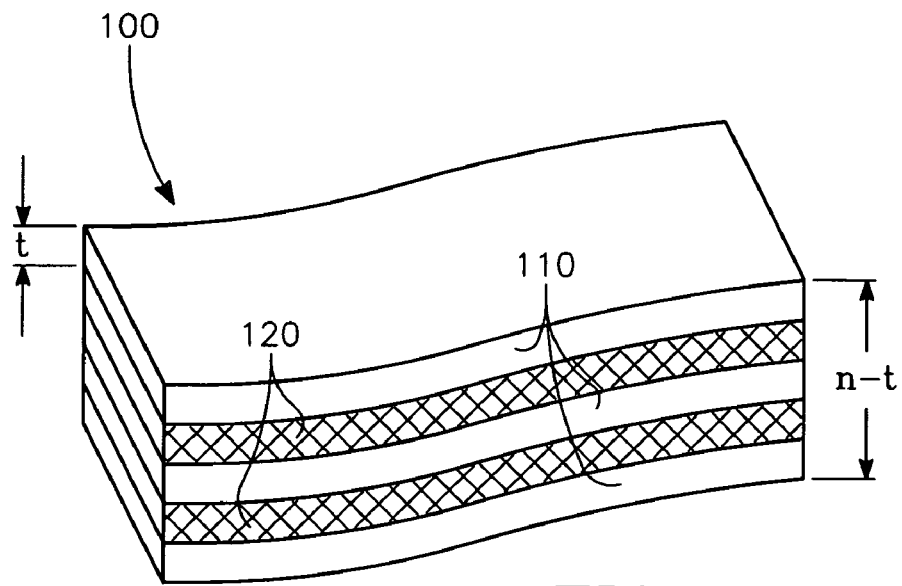
FIG. 1 is a cut away perspective view of a simplified illustration of a variable stiffness structure in accordance with an embodiment of the present invention.
Figure 2A:
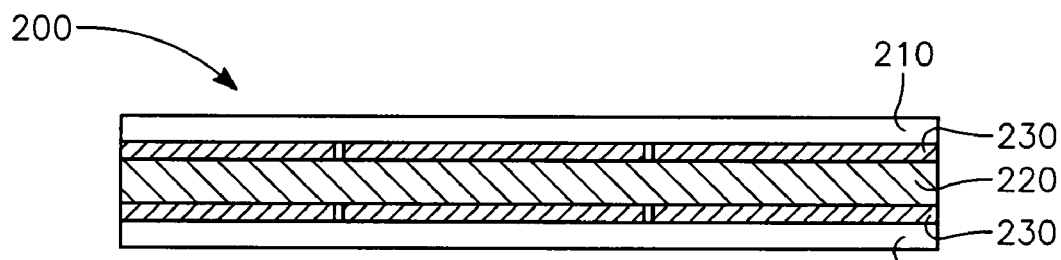
FIG. 2A is a cross sectional view of a simplified illustration of a variable stiffness structure in accordance with an embodiment of the present invention.
Figure 2B:
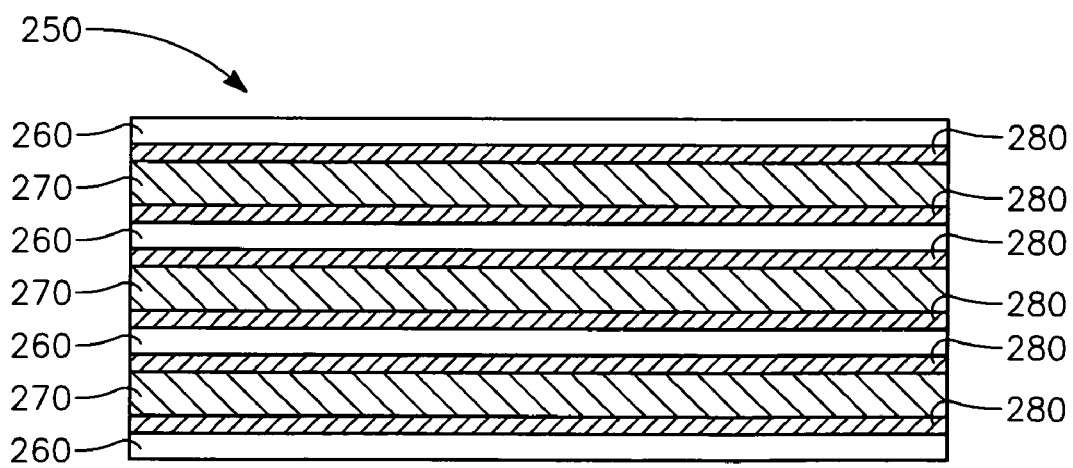
FIG. 2B is a cross sectional view of a simplified illustration of a variable stiffness structure in accordance with an embodiment of the present invention.

FIGS. 1, 2A, and 2B

FIG. 1 is a cut away perspective view of a simplified illustration of variable stiffness structure 100 in accordance with an embodiment of the present invention. The variable stiffness structure 100 includes constant stiffness material layers 110 and variable modulus material layers 120. The variable stiffness structure 100 is a structure whose elastic stiffness in bending and/or axial/compression loading may be adjusted when required by applying, exposing it to, or otherwise subjecting it to, appropriate control conditions (i.e., thermal, electrical, magnetic, chemical, electromagnetic, etc.). In the embodiment shown in FIG. 1, the constant stiffness material layers 110 and the variable modulus material layers 120 are arranged in alternating layers.

The constant stiffness material layers 110 include a material selected to provide structural stiffness to the variable stiffness structure 100. Non-limiting examples of constant stiffness material include aluminum alloys, steel alloys (such as tempered 1095, or the like), titanium alloys, polymer matrix glass fiber composites, polymer matrix carbon fiber composites, polymer matrix polymer fiber composites (such as KEVLAR, SPECTRA, or the like), ceramic, semiconductor, and structural polymer materials (such as PTO, epoxy, or the like).

The variable modulus material layers 120 provide adjustable coupling between the constant stiffness material layers 110. This is primarily accomplished by changing the shear stiffness of the variable modulus material layers 120 by means of a control field. The type of control field used to change the stiffness of the variable modulus material layers 120 varies with different types of materials, and allows for a convenient means of discriminating between materials.

The variable modulus material layers 120 may include materials controlled thermally, electrically, magnetically, chemically, and/or electromagnetically. Non-limiting examples of thermally controlled materials include shape memory polymers and shape memory alloys. A related class of thermal materials which change stiffness in association with a change in the phase of the material include solid-liquid phase change materials. Non-limiting examples of this type of phase change materials include metals and metal alloys, polymers, wax, water, etc. Non-limiting examples of materials which undergo a change in stiffness associated with the application of an electrical field include ferroelectric materials, electrostrictive polymers, liquid crystal elastomers, and electrorheological fluids. Non-limiting examples of materials which undergo a change in stiffness associated with the application of a magnetic field include magnetostrictive materials, ferromagnetic shape memory alloys, and magnetorheological materials.

The variable stiffness structure 100 has an alternating layered structure. The constant stiffness material layers 110 act as the load bearing component, and the variable modulus material layers 120 act as an adjustable component by which the properties of the structure 100 can be tuned. By altering the stiffness of the variable modulus material layers 120, a large change in the bending stiffness of the structure 100 can be obtained. Altering the stiffness of the variable modulus material layers 120 from high to low values effectively changes the mode of deformation from extension of the constant stiffness material layers 110 (high energy) to bending of the constant stiffness material layers (low energy). Using this principle, large changes in the effective bending modulus of the variable stiffness structure 100 can be achieved.

For illustration, one non-limiting example using shape memory polymer materials as the variable modulus material layers 120 and spring steel as the constant stiffness material layers 110 will be discussed. In the simplest case, a stack of layers is assembled so that at temperatures below the transition temperature of the shape memory polymer, the bending modulus of the variable modulus material layers 120 is large (for example 50 GPa). If the variable stiffness structure 100 is heated above the transition temperature of the shape memory polymer, the constant stiffness material layers 110 become essentially decoupled, and the bending stiffness of this structure is reduced (for example 1 GPa).

The following describes the shape fixity functionality of the variable stiffness structure 100 when using shape memory polymer as the variable modulus material of layers 120. First, the structure 100 is deformed with its temperature above the transition temperature by bending the variable stiffness structure 100 and shearing the constant stiffness material layers 110 with respect to one another. Second the structure is cooled below the transition temperature while constrained in the new shape so that the new shape is retained after cooling, without requiring the application of retaining forces. This is due to the intrinsic shape fixity of the shape memory polymer. This functionality is important to applications requiring semi-permanent shape change such as structural morphing. While this example has been given using shape memory polymer as the variable modulus material layers 120, similar functionality could be obtained using phase changing materials such as wax and metal alloys. This allows translation of the constant stiffness material layers 110 past each other, providing a means to facilitate deformation. In certain embodiments it is possible to control a large change in elastic stiffness through the change in stiffness of the variable modulus material layers 120. The layered geometry permits the controlling material to be relatively compliant, yet the overall structure stiffness to be high.

In one empirical embodiment, a change in stiffness of nearly two orders of magnitude in response to a temperature change was observed. Although many polymers exist that exhibit this type of change with temperature, certain embodiments of the present invention allow structures with an upper bound stiffness that is comparable to structural materials, such as steel and aluminum. Thus, in some embodiments where several operating conditions may be desired from a single structural component or surface, lightweight morphing structural or surface structures are possible.

Material selection and mechanical design leads to several different embodiments, with different effective properties in terms of total deformation, response speed, and total change in modulus. Material selection will depend in part upon the particular application. For example, in some embodiments a material should be selected so that the radius of curvature of an individual layer does not exceed that required to reach plastic strain magnitude. The upper bound of permissible radius of curvature can be obtained using beam theory:

$$\frac{1}{\rho} = \frac{\varepsilon^p}{t}$$

where:
  $\rho$ is the radius of curvature,
  $\epsilon^p$ is the critical strain at the elastic/plastic limit, and
  t is half the thickness of an individual constant stiffness material layer 110.

Therefore, the radius of curvature is decreased by either increasing the elastic limit or by decreasing the thickness of the constant stiffness material layers 110.

Specifically, in some embodiments the constant stiffness material layers 110 include high strain limit elastic metallic alloys such as high strength steels, aluminum, etc. In other embodiments, the constant stiffness material layers 110 include composite material based on fibrous materials, such as for example carbon or glass fiber.

It is possible that in some embodiments that a permanent deformation is desirable. In such a case, a suitable material and appropriately scaled layer thickness of the constant stiffness material layers 110 will allow a permanent deformation to be incurred over a particular range. Furthermore, in some embodiments, after permanent deformation has occurred, the structure may be actuated around the permanent deformation. This functionality may be useful, for instance, for an initial deployment where the first actuation is desired to be permanent (as in an expandable structure), and afterwards only smaller temporary modifications are desired.

The material of the variable modulus material layers 120 may be selected so that it may be controlled via thermal, electric, or magnetic fields. The function of the variable modulus material layers 120 is to couple and/or decouple the constant stiffness material layers 110 mechanically, so that either stress is transferred from one layer to the next, or it is not. The effect of this connection/disconnection is to allow significant alteration of the bending stiffness of the variable stiffness structure 100. This results from cubic dependence of bending stiffness on thickness.

Suitable materials for the variable modulus material layers 120 should exhibit a large reversible change in intrinsic or shear modulus. In some embodiments, this effect should take place over as great a strain range as possible. For example, magnetostrictive and piezoelectric materials exhibit a large change in modulus, about five times, but the change takes place over a strain range of approximately 500 microstrain or 0.05%. In contrast, a shape memory polymer material may exhibit a change in modulus of 100 times and may exhibit this effect over a strain range of 100%.

Depending on the specific application, however, other considerations may influence selection of the variable modulus material. If response time is important, a magnetostrictive material, or a piezoelectric material may be employed to supply a rapid change in modulus on the order of fractions of milliseconds. A single crystal piezoelectric for example may provide the desired response time, with an acceptable change in modulus for some applications.

In contrast, a shape memory polymer material requiring thermal stimulation will have response times on the order of seconds to minutes and may require significantly larger amounts of energy to obtain the change in stiffness.

In some embodiments, another attribute of the variable modulus material could be to supply a zero power hold capability to the structural or surface structure utilizing the variable modulus material. This would require the variable modulus material to have sufficient stiffness in the zero power state to resist any strain energy built up in the constant stiffness material layers or other elastic components. This attribute is important in some deformable surface/structure embodiments where power consumption is a concern. In such embodiments, much of the benefit could be lost if continuous power is required to maintain a given state. A shape memory polymer has been successful in performing this action.

In certain embodiments, the variable modulus material may include electrorheological fluids, which change modulus in response to an electric field. Similarly, in some embodiments the variable modulus material may include magnetorheological fluids, which change modulus in response to a magnetic field. In general these fluids will support less shear stress so their application may be limited.

In certain embodiments with morphing structural or surface structures, a shape memory polymer material having as large as possible change in stiffness and with the greatest possible strain deformation will permit a large reversible strain and zero power hold. One drawback to this approach is the thermal nature of activation requires both a large amount of energy to induce a change as well as long durations due to the relatively slow thermal transport.

In some embodiments to improve response time, a large number of thinner constant stiffness layers, i.e., tens, hundreds, thousands or more are provided rather than only a few. In heat-activated embodiments, a larger number of layers will improve thermal transport properties. In electric or magnetic field activated embodiments, a large number of layers will allow smaller distances across the variable modulus material layers to improve the field strength across the variable modulus material layers.

FIG. 2A shows a cross sectional view of a simplified illustration of a variable stiffness structure 200 in accordance with one possible embodiment of the present invention. In this embodiment, an activation component 230 is provided. The activation component 230 either assists, or causes, the variable modulus material layer 220 to change its modulus. For example, the activation component 230 may be a heater in the case of thermally activated variable modulus material layer 220. Thus, in the case of shape memory polymer variable modulus material layers, the activation component 230 may be an embedded resistive heater capable of raising the temperature of the variable modulus material layers. For variable modulus material layers which activate via an applied electric field, the activation component 230 may be a thin electrical conductor. The activation component 230 may be an electrical conductor, magnetic flux generator, a structure or material capable of carrying flux, a heat transfer means, some combination these, or the like, depending on the nature of the control mechanism required to activate the variable modulus material layer 220 to change its modulus. Layers 210 are the constant stiffness material layers.

FIG. 2B shows a cross sectional view of a simplified illustration of a variable stiffness structure 250 in accordance with one possible embodiment of the present invention. In such embodiments, a bonding component 280 may be added between the constant stiffness material layers 260 and the variable modulus material layers 270 to provide adhesion and stress transfer between the layers 260 and 270. Non-limiting examples include thermosetting polymer adhesives such as epoxy, vinyl ester, poly ester, polyurethane, cyanoacrylics, or the like, and thermoplastic polymer adhesives, such as polyurethane, hot-melt type adhesives, or the like.

Some embodiments, not shown, may include both the activation component 230 of FIG. 2A and the bonding component 280 of 2B. The bonding component 280 may be located between the constant stiffness material layers 210 and the activation component 230, and/or between the variable modulus material layer or layers 220 and the activation component 230.

ADDITIONAL EMBODIMENTS OF THE VARIABLE MODULUS MATERIAL LAYER

FIGS. 3 through 7

A wider functionality space may be obtained in the variable stiffness structure by altering the form of the variable stiffness material. While the most basic configuration requires a planar variable stiffness material, other non-planar forms can provide properties advantageous in certain circumstances. FIGS. 3 through 7 illustrate variable stiffness structures having specially configured variable modulus material layers.

Figure 3:
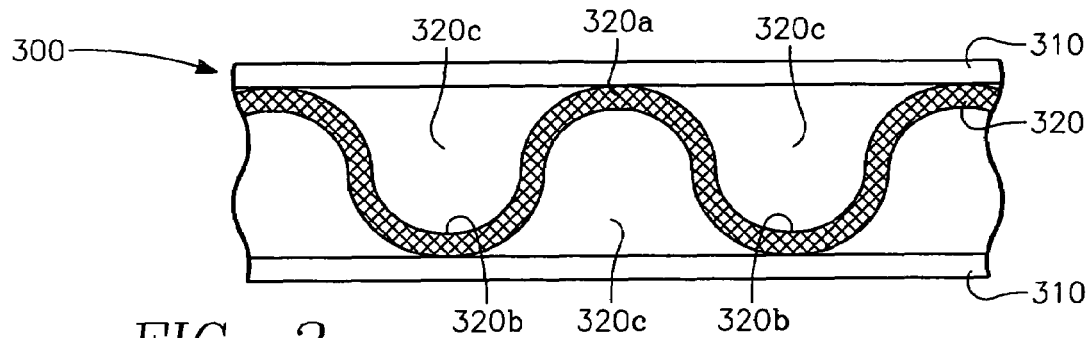
FIGS. 3 and 4 are cross sectional views of portions of variable stiffness structures in accordance with certain corrugated embodiments of the variable modulus material layer.
Figure 4:
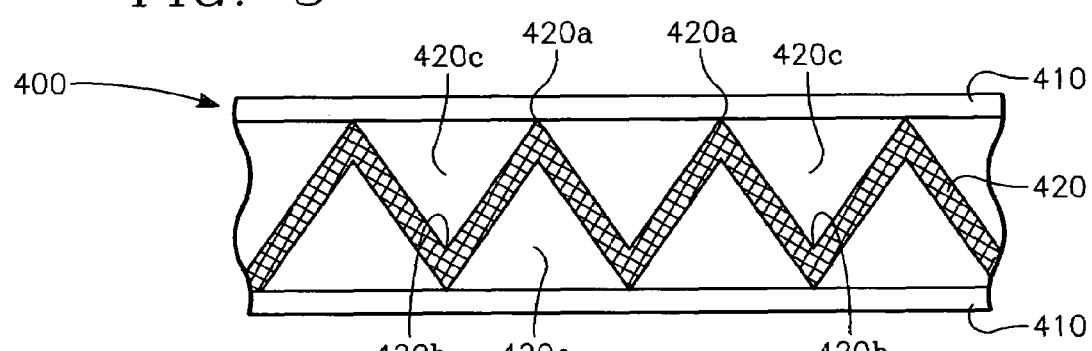

FIGS. 3 and 4 are cross sectional views of portions of variable stiffness structures in accordance with certain corrugated embodiments of the variable modulus material layer. The variable stiffness structure embodiment 300 of FIG. 3 includes a shaped variable modulus material layer 320 interposed between constant stiffness material layers 310. In this embodiment, the variable modulus material layer 320 has a corrugated shape with ridges 320*a* and grooves 320*b*. Spaces 320*c* formed in the variable modulus material layer 320 by the ridges 320*a* and grooves 320*b* accommodate larger deformation than is possible in the planar configuration because the empty space will allow the variable modulus material layer 320 to locally buckle and provide greater effective strain. Shown in FIG. 4, the variable stiffness structure embodiment 400 includes a shaped variable modulus material layer 420 interposed between constant stiffness material layers 410. In this embodiment, the variable modulus material layer 420 has a corrugated shape with angular ridges 420a and grooves 420b. As above, spaces 420c formed in the variable modulus material layers by the ridges 420a and grooves 420b provide spaces to accommodate deformation and reduce stress in the variable stiffness material. Other corrugated configurations are possible.

Figure 5:
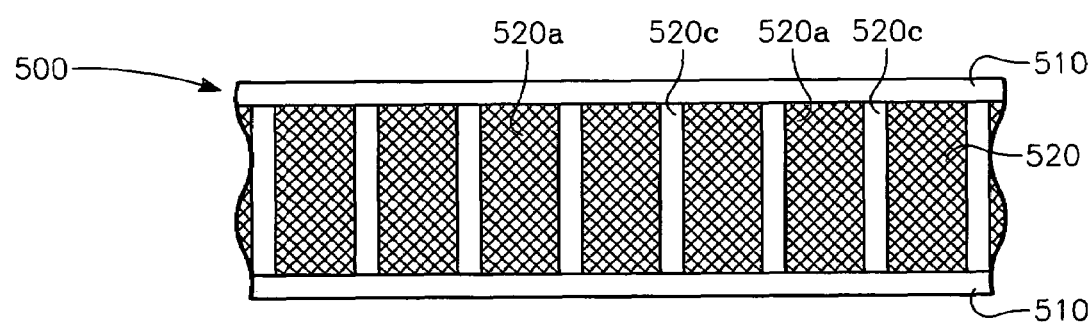
FIG. 5 is a cross sectional view of a portion of a variable stiffness structure in accordance with one embodiment of the present invention.

FIG. 5 is a cross sectional view of a portion of a variable stiffness structure 500 in accordance with one embodiment of the present invention. In this embodiment, the variable modulus material layer 520 has a pillared configuration. Between the pillars 520a are spaces 520c. The pillars 520a are shown extending between the constant stiffness material layers 510. Although the spaces 520c are shown completely separating the pillars 520a, in some embodiments the pillars 520a may be attached to each other. Further, the pillars need not contact either or both of the adjacent constant stiffness material layers 510 as shown in FIG. 5, but may be only a portion of the variable modulus material layer 520.

Figure 6:
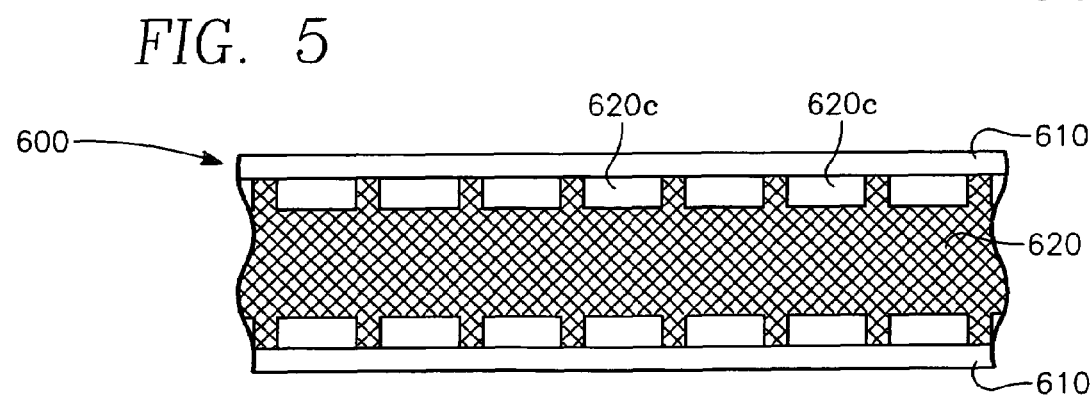
FIG. 6 is a cross sectional view of a portion of a variable stiffness structure in accordance with one embodiment of the present invention.

FIG. 6 is a cross sectional view of a portion of a variable stiffness structure 600 in accordance with one embodiment of the present invention. In this embodiment, the variable modulus material layer 620 includes grooves 620c. The grooves 620c may extend part way into the variable modulus material layer 620 as shown, or they may extend all the way between adjacent constant stiffness material layers 610. The grooves 620c may be striations or may form separations between walls of variable modulus material (not shown). Furthermore, although the embodiment of FIG. 6 shows only grooves 620c extending into the cross section of the variable stiffness structure 600, there may be additional grooves (not shown) intersecting, i.e., perpendicular, cross-hatching, etc., to the grooves 620c shown in FIG. 6. The grooves 620c accommodate deformation and increase the bonding toughness of the bonding between layers.

Figure 7:
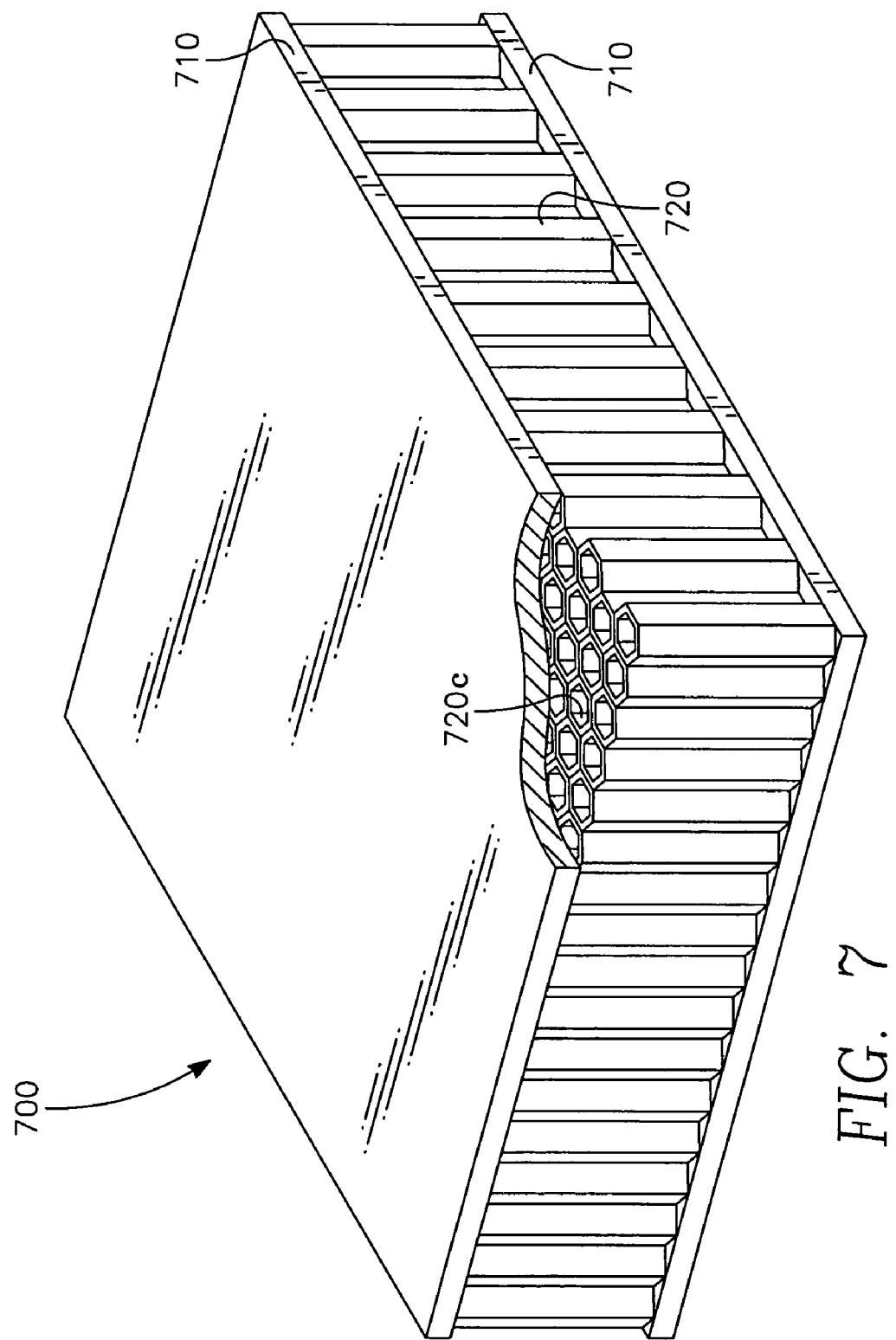
FIG. 7 is an exploded perspective view of a portion of a variable stiffness structure.

FIG. 7 is an exploded perspective view of a portion of a variable stiffness structure 700. In this embodiment, the variable modulus material layer 720 has tubular configuration. The tubes 720c may have a honeycomb structure as illustrated in FIG. 7. The tubes 720c within the variable modulus material layer 720 extended end-to-end between adjacent constant stiffness material layers 710.

Certain embodiments of the present invention are adapted to provide improved single axis deformation, while some embodiments provide improved multi-axis deformation. For example, the embodiment shown in FIG. 7 can provide improved deformation in multiple bending directions. Moreover certain variations of the embodiments of FIGS. 5 and 6 discussed above may provide improved multi-axis deformation.

Although FIGS. 3 through 7 show only two constant stiffness material layers with a variable modulus layer in between for illustration purposes, in other embodiments not shown, the structure may contain tens, hundreds, or more layers. Furthermore, although shown with a regular and symmetrical configuration, it is not necessary that variable modulus material layers have regular or symmetrically placed spaces within.

Many different variable modulus materials are possible. An example of a shape memory alloy is NiTi, which exhibits a large change in modulus (about 3 times, 15-65 GPa) as function of temperature. A thermoplastic polymer will change modulus when heated to its glass transition temperature, so in some embodiments, utilization of some forms of thermoplastic polymers is possible, such as for example, nylon, polyurethane, etc. In general, shape memory polymers regain shape so they may perform better in some embodiments. One possible shape memory polymer is polyurethane MM5510, produced by Mitsubishi Heavy Industries, Ltd., Nagoya, Japan. An example of a piezoelectric is PZT 5H from TRS Technologies, Inc., located in State College, Pa., www.trstechnologies.com, or from PI (Physik Insturmente) L. P., of Auburn, Mass., www.physikinstrumente.de. One possible electrostrictive polymer is PVDF available from Goodfellow, located in Devon, Pa. An irradiated electrostrictive polymer such as P(VDF-TrFE), developed by Zhang, et al., at the Pennsylvania State University, described in Feng Xia, Z.-Y. Cheng, Haisheng Xu, and Q. M. Zhang, G. Kavarnos, R. Ting, G. Abdul-Sedat, K. D. Belfield. High Electromechanical Responses in Terpolymer of Poly(vinylidene fluoride-trifluoroethylene-chlorofluoroethylene). Adv. Maters. 14, 1574 (2002) may be utilized in some situations. An example of a magnetostrictive material is $Tb_xDy_{(1-x)}Fe_{1.9\to2.1}$ available as TERFENOL-D from Etrema Products, Inc., located in Ames, Iowa. Another possible magnetostrictive material is FeGa available as GALFENOL, also available from Etrema Products. Other variable modulus materials are possible.

ADDITIONAL EMBODIMENTS OF THE CONSTANT STIFFNESS MATERIAL LAYERS

FIGS. 8A through 11C

Certain embodiments of the variable stiffness structure are improved through the use of a segmented constant stiffness layer rather than a continuous sheet. The segments may lie within a plane to allow translation of segments. The size, shape, and layout of these elements may be optimized to provide functionality desired for a particular application. In particular applications requiring a change in the area (bi-axial in-plane strain) is desirable. In other applications it is desirable to have local control of the variable stiffness material such that certain local areas are made to reduce stiffness and achieve large strain while others are kept rigid and do not exhibit large strain. Both applications are facilitated by segmenting the constant stiffness material layers within a single plane. It should be noted that in this configuration both the bending and axial modulus of the variable stiffness structures will vary as a function of the modulus of the variable modulus material layers.

The form, shape, and layout of the segmented constant variable modulus material layers can be optimized for given application requirements. Non-limiting variables that can be controlled through the proper design of this layer include upper bound stiffness, total planar strain allowed, and/or buckling stress of the segmented constant stiffness material layers. Several arrangements for shapes and layouts are possible. Non-limiting examples include three, four, five, and six sided configurations, as illustrated in FIGS. 10A-10F.

Figure 8A:
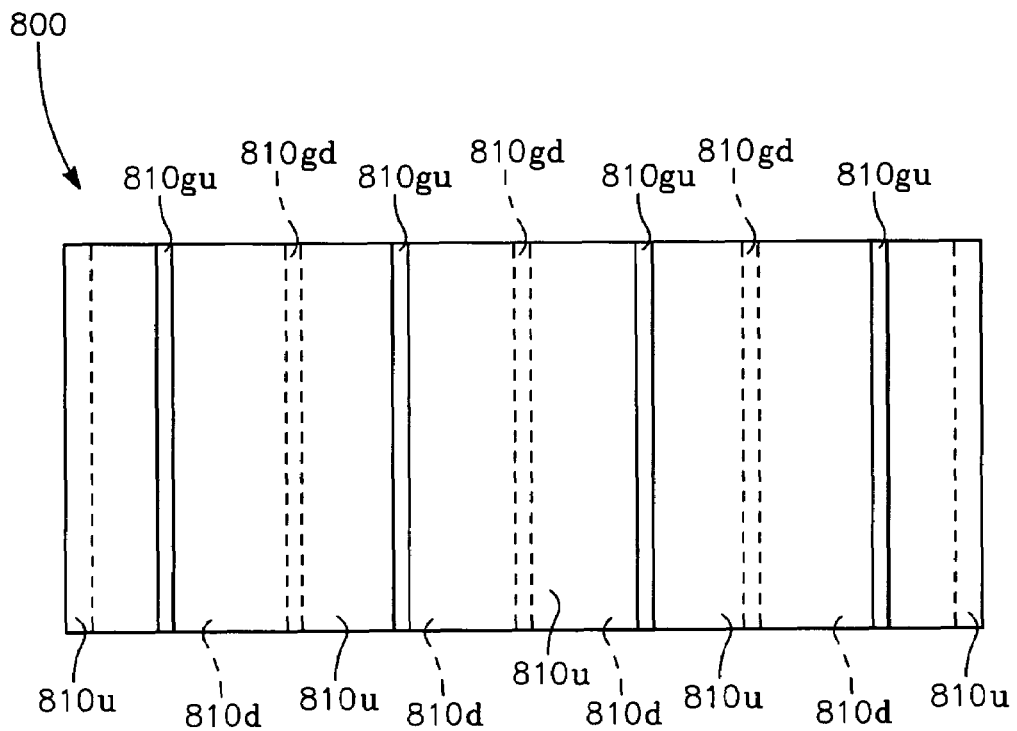
FIGS. 8A and 8B show partial top and side views, respectively, of a simplified variable stiffness structure.

FIGS. 8A through 9B illustrate variable stiffness structures having specially configured constant stiffness material layers. FIGS. 8A and 8B show partial top and side views, respectively, of a simplified variable stiffness structure 800. To facilitate translation and inhibit buckling of the constant stiffness material layers 810, the constant stiffness material layers 810 may be segmented, with spaces 810gu between the upper layer segments 810u and spaces 810gd between the lower layer segments 810d, as shown in FIGS. 8A and 8B. The spaces 810gu and 810gd between the segments 810u and 810d, respectively, permit translation with respect to one another during the bending deformation in the low modulus state.

Figure 8B:
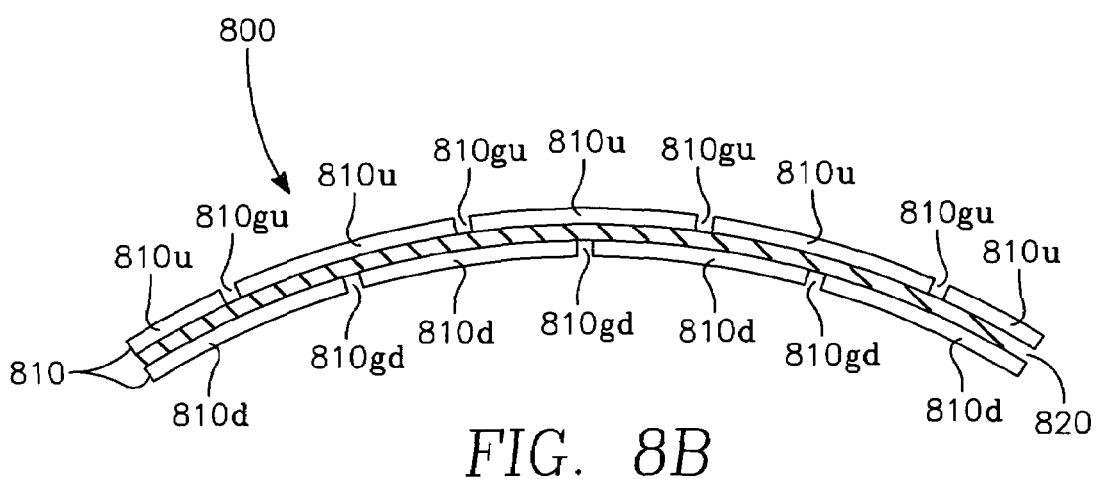

FIGS. 8A and 8B show only two constant stiffness material layers 810 with a variable modulus material layer 820 in between for illustration purposes. In other embodiments not shown, the structure 800 may contain tens, hundreds, or more layers.

Figure 9A:
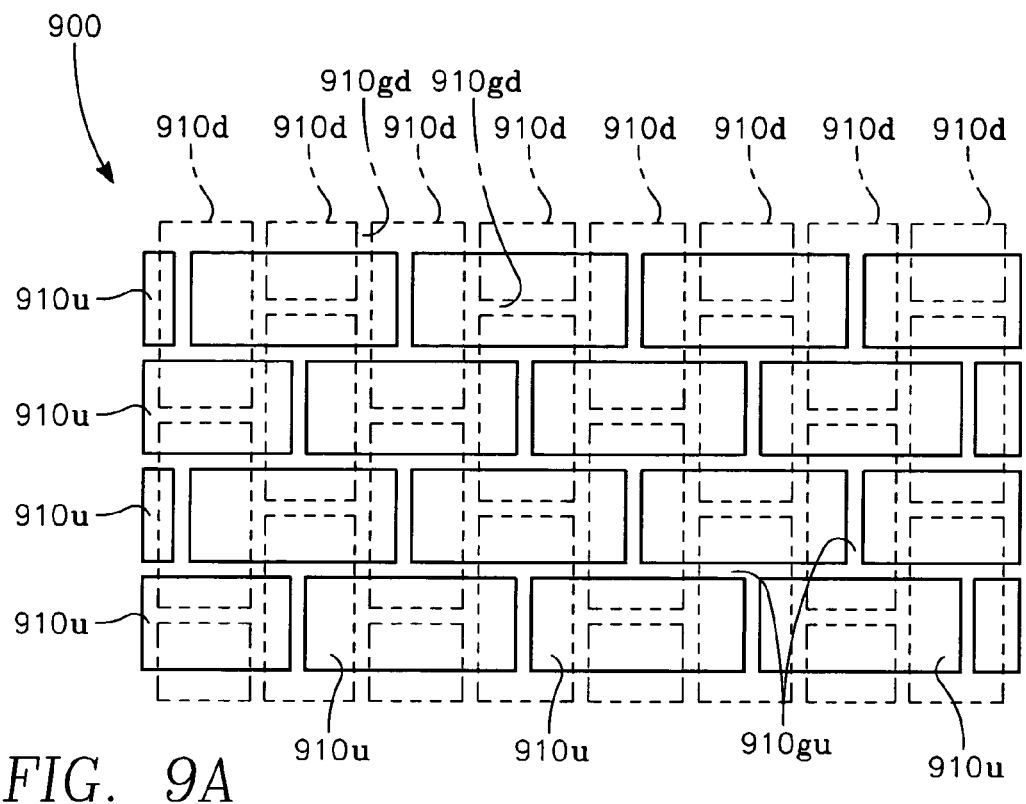
FIGS. 9A and 9B show partial top and side views, respectively, of a simplified variable stiffness structure.
Figure 9B:
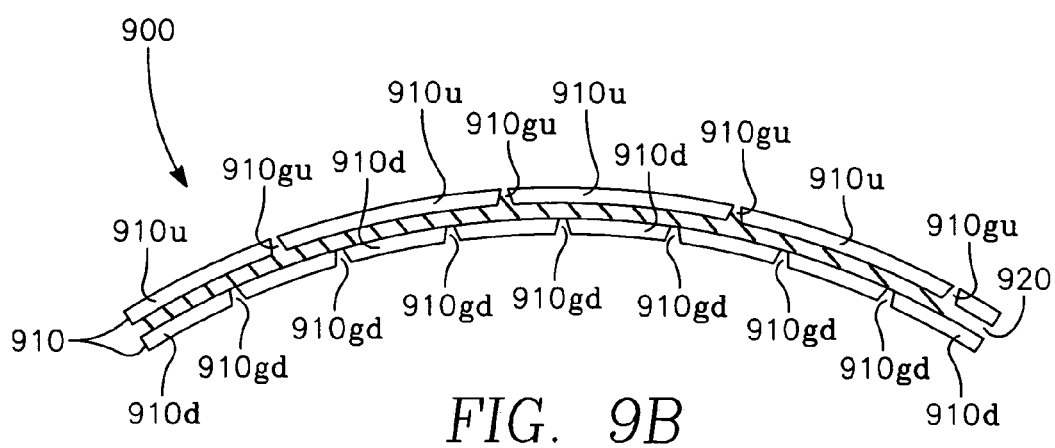
Figure 10A:
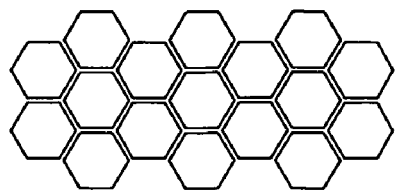
FIGS. 10A through 10F are top views of simplified illustrations of possible embodiments of the constant stiffness material layers.
Figure 10B:
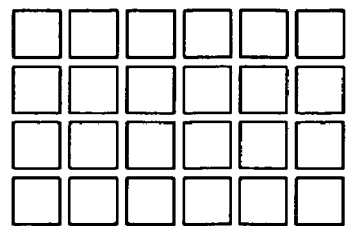
Figure 10C:
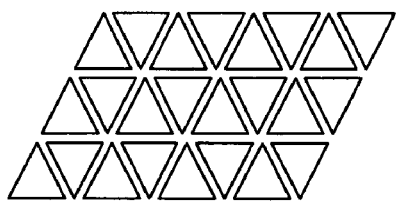
Figure 10D:
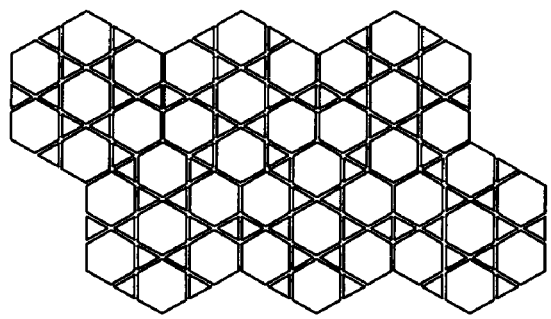
Figure 10E:
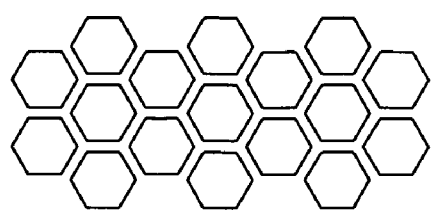
Figure 10F:
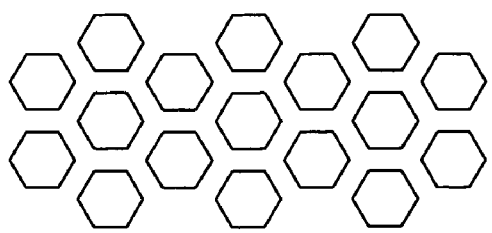

FIGS. 9A and 9B show partial top and side views, respectively, of a simplified variable stiffness structure 900 capable of multiple axes deformation. As above, to facilitate translation and inhibit buckling of the constant stiffness material layers 910, the constant stiffness material layers 910 may be segmented, with spaces 910gu between the upper layer segments 910u and with spaces 910gd between the lower layer segments 910d. The upper layer segments 910u and lower layer segments 910d may have an overlapping mosaic-type arrangement as shown in FIG. 9A. The specific layout of the segmented layers including the size of the individual sections as well as the spaces between the sections can be varied to provide different functionalities. In addition, different size and shape sections may be combined, for example three sided sections with six sided sections to produce regions of varying area density.

Another approach that may be advantageous in certain embodiments involves designing the segmented constant stiffness layers such that stiffness may be non-isotropic throughout the thickness of the variable stiffness material. This may be done by changing the aspect ratio and orientation of the segmented constant stiffness material layers. Non-isotropic stiffness properties may be useful, for example, in tailoring structural deformation for a known mechanical loading. One non-limiting example is a member that will both bend and twist in response to a pure bending load. This could be advantageous for example in designing a structure that optimizes its performance passively in response to expected mechanical loading. (for example, wind loading on an airplane wing).

In the embodiment shown in FIGS. 9A and 9B, the segments 910 are elongated, with the upper layer segments 910u being oriented lengthwise along a first axis, while the lower layer segments 910d are oriented lengthwise along a second axis which is orthogonal to the first axis. In addition, in this embodiment, the upper layer segments 910u are arranged so that the spaces 910gd surrounding the lower layer segments 910d are offset from the spaces 910gu surrounding the upper layer segments 910u. Thus, the upper layer segments 910u overlap the spaces 910gd between adjacent lower layer segments 910d. To maintain a large overall stiffness, the spaces 910gu and 910gd between the segments 910 may be arranged so that there exists at least one segment 910 above and below any particular space 910gu or 910gd.

Such an overlapping structure will have strength and stiffness approaching that of a structure formed of continuous sheets. The function of this pattern is to allow translation of the individual segments 910 along both axes to permit larger deflection (while inhibiting buckling) than would be possible with continuous sheets of constant stiffness material.

As above, FIGS. 8A through 9B show only two constant stiffness material layers with a variable modulus layer in between for illustration purposes. In other embodiments not shown, the structure may contain tens, hundreds, or more layers.

Figure 11A:
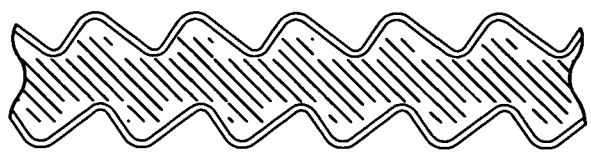
FIGS. 11A through 11C are cross sectional side views of simplified illustrations of a variable stiffness structure embodiment.
Figure 11B:
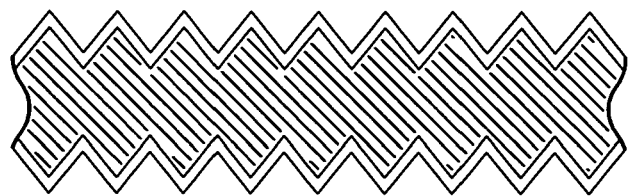
Figure 11C:
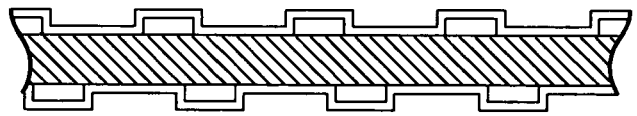

In some cases, it may be advantageous for the constant stiffness material layers to be non-planar. For example the constant stiffness layers may assume the shape of a corrugated sheet (not shown). This can have the advantage over planar approaches in that larger in-plane strain can be achieved due to the flexible nature of this structure. The corrugation could be of several forms including sinusoidal, triangular, rectangular, and others. Non-limiting examples are illustrated in FIGS. 11A-11C. In certain embodiments, the constant stiffness material layers may have depressions, channels, recesses, bulges, projections, or the like (not shown) to change the coupling characteristics between the constant stiffness material layers and the variable modulus material layers, for a particular application.

EXAMPLE EXPERIMENTAL RESULTS

FIG. 12

Figure 12:
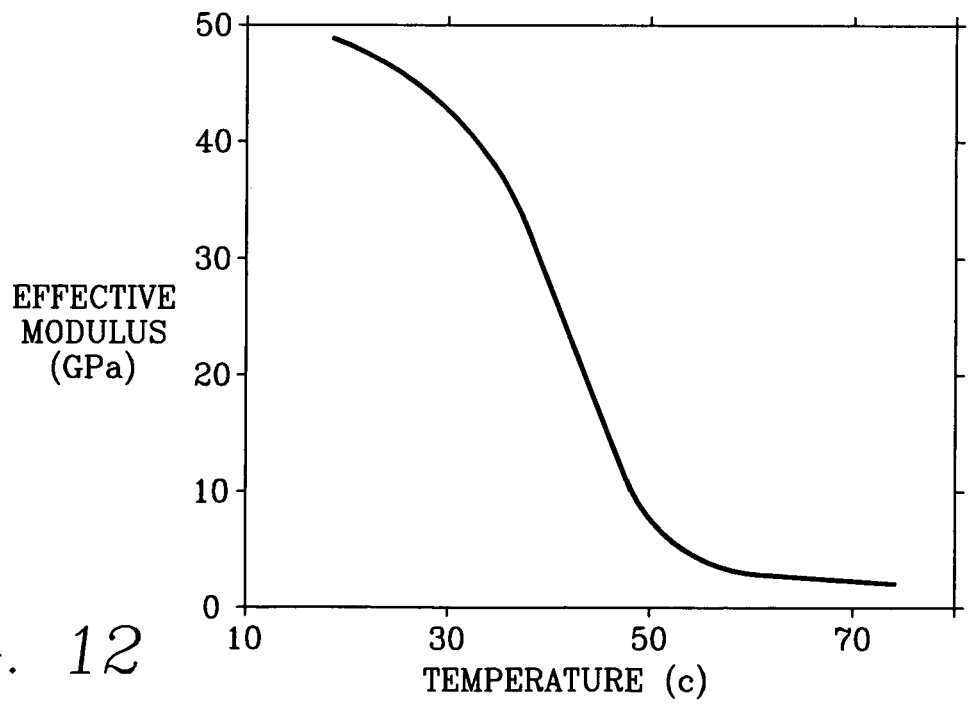
FIG. 12 shows a graph of empirical results of the effective modulus verses temperature for an example embodiment.

In one example embodiment, the constant stiffness material was a stainless steel sheet of thickness 0.006-0.007 inch. The variable modulus material was a polyurethane shape memory polymer of thickness 0.01 inch. A structure consisting of 5 steel and 4 polymer layers was tested in a dynamic mechanical analyzer or DMA to determine the effective elastic modulus of the material as a function of temperature. FIG. 12 shows a graph of empirical results of the effective modulus verses temperature for an example embodiment. The modulus varies from a maximum of about 50 Gpa to a minimum of 2.5 Gpa. This is a change of more than one order of magnitude and a decrease in modulus of about 95% in the effective modulus, from the low modulus to the high modulus states. Further, the example embodiment provided zero power hold in a deformed, arch shaped configuration and a large reversible strain of more than 1.25% effective strain. In other example embodiments, a larger thickness shape memory polymer provided similar changes in modulus, but with a slightly lower upper bound modulus.

Another embodiment uses segmented steel as the segmented constant stiffness material layers, and shape memory polymer as the variable stiffness material. A structure consisting of 5 segmented steel layers and 4 shape memory polymers layers was assembled and tested in bending stiffness from room temperature to 90° C. The stiffness of this structure varies from 34 GPa and 5 GPa in the upper and lower temperature regimes, respectively.

There are many applications of the variable stiffness structures. In one implementation, morphing surfaces and structures are feasible. As the upper bound stiffness can be made large and comparable to common structural engineering materials, structural components may be made of a variable stiffness structure. As such, the variable stiffness structure can take many forms. Specific applications will demand particular characteristics from the variable stiffness structure, which will determine the form of the material.

Morphing a surface and/or structural component can allow additional functionality and/or optimum operating conditions over a broader range of operating states, than conventional approaches. Conventional approaches to morphing rely on discrete actuators and sensors that deform a structurally stiff component in order to obtain a new shape or use sliding and rotation of rigid components with complicated and heavy hinges and joints. These conventional approaches tend to be onerous due to the necessity of large and powerful actuators and latching mechanisms in order to deform a stiff structural component and maintain that deformation after actuation. In particular, these solutions scale poorly to very lightweight and large structures, for example antennas, reflectors, large surface panels, etc. Utilizing a variable stiffness structure enables an entirely different approach and vastly expands the practical uses of morphing.

In some implementations, the variable stiffness structure can provide structural characteristics that can also be softened, repositioned, and subsequently maintain its position without requiring additional components for maintaining its position. Chief among benefits to this approach, is a massive reduction in the power necessary to obtain large deflections of a structure. The energy input necessary to deform a structure scales linearly with the elastic modulus of the material being deformed. Therefore, a drop in stiffness by 10× results in 10 times less energy necessary to deform the structure. This further results in a lighter weight system that requires less power to change shape.

Structural components and surfaces where lightweight and low power consumption are critical will particularly benefit by the variable stiffness structure, such as in vehicles, aircraft, and spacecraft. For example, an aircraft wing surface utilizing a variable stiffness structure could be morphed into one shape for take-off and low speed operation, then softened, morphed, and stiffened to operate in a new condition. Many other applications are possible in a variety of technologies.

Having described this invention in connection with a number of embodiments, modification will now certainly suggest itself to those skilled in the art. As such, the invention is not to be limited to the disclosed embodiments except as required by the appended claims. The above description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

What is claimed is:

1. A variable stiffness structure comprising:
    a) a plurality of constant stiffness material layers;
    b) a plurality of variable modulus material layers arranged in alternating layers with the plurality of constant stiffness layers, the plurality of variable modulus material layers comprising a material capable of changing elastic modulus in response to one of (1) an electric field; (2) a magnetic field; or (3) a thermal field so as to be capable of reversible coupling and decoupling of stress transfer between successive layers of the plurality of constant stiffness material layers to provide a change in a bending stiffness of the variable stiffness structure; and
    c) each of the plurality of constant stiffness material layers comprising segmented portions separated by gaps and arranged such that successive layers of the plurality of constant stiffness material layers comprise segmented portions overlapping the gaps between segmented portions of an adjacent constant stiffness material layer.

2. The variable stiffness structure of claim 1 wherein alternating layers of the plurality of constant stiffness material layers comprise elongated planar sections oriented along a first direction, and wherein alternating layers of the plurality of constant stiffness material layers comprise elongated planar sections oriented along a second direction.

3. The variable stiffness structure of claim 2 wherein the first direction and the second direction are perpendicular.

4. The variable stiffness structure of claim 1 wherein the plurality of variable modulus material layers comprise spaces therein.

5. The variable stiffness structure of claim 1 wherein the plurality of variable modulus material layers comprise grooves.

6. The variable stiffness structure of claim 4 wherein the shaped structure of the plurality of variable modulus material layers comprises at least one of: (a) corrugation; (b) pillars; (c) striations; (d) tubes; or (e) honeycombs.

7. The variable stiffness structure of claim 1 wherein the plurality of variable modulus material layers are configured so as to inhibit buckling of the plurality of constant stiffness material layers.

8. The variable stiffness structure of claim 1 wherein the constant stiffness material layers comprise at least one of: (a) a metal; (b) an alloy; (c) a fiber composite; (d) a ceramic; or (e) a semiconductor.

9. The variable stiffness structure of claim 8 wherein the constant stiffness material layers comprise at least one of: (a) steel; or (b) aluminum.

10. A variable stiffness structure comprising:
    a) a plurality of constant stiffness material layers;
    b) a plurality of variable modulus material layers laminated in alternating layers with the plurality of constant stiffness layers, the plurality of variable modulus material layers comprising a material capable of changing elastic modulus in response to a control field activator associated therewith, adapted to apply one of: (1) an electric field; (2) a magnetic field; or (3) a thermal field so as to be capable of reversible coupling and decoupling of stress transfer between successive layers of the plurality of constant stiffness material layers to provide a change in a bending stiffness of the variable stiffness structure; and
    c) selected layers of the plurality of constant stiffness material layers comprising segmented planar sections separated by gaps, the segmented planar sections of the constant stiffness material layers being adhered by and to adjacent layers of the plurality of variable modulus material layers.

11. The variable stiffness structure of claim 10 wherein the segmented portions are arranged such that the planar sections of one constant stiffness layer overlap the gaps of an adjacent constant stiffness layer.

12. The variable stiffness structure of claim 11 wherein alternating layers of the plurality of constant stiffness material layers comprise elongated segments oriented along a first direction, and wherein alternating layers of the plurality of constant stiffness material layers comprise elongated segments oriented along a second direction.

13. The variable stiffness structure of claim 12 wherein the first direction and the second direction are perpendicular.

14. The variable stiffness structure of claim 10 wherein the plurality of variable modulus material layers comprise spaces therein.

15. The variable stiffness structure of claim 10 wherein the plurality of variable modulus material layers comprise grooves.

16. The variable stiffness structure of claim 14 wherein the shaped structure of the plurality of variable modulus material layers comprises one of: (a) corrugation; (b) pillars; (c) striations; (d) tubes; or (e) honeycombs.

17. The variable stiffness structure of claim 10 wherein the constant stiffness material layers comprises at least one of: (a) a metal; (b) an alloy; or (c) a fiber composite.

18. The variable stiffness structure of claim 17 wherein the constant stiffness material layers comprise at least one of: (a) steel; or (b) aluminum.

19. A variable stiffness structure comprising:
  a) a plurality of constant stiffness material layers;
  b) a plurality of variable modulus material layers laminated in alternating layers with the plurality of constant stiffness layers, the plurality of variable modulus material layers comprising a material capable of changing elastic modulus in response to a control field activator associated therewith, adapted to apply one of: (1) an electric field; (2) a magnetic field; or (3) a thermal field so as to be capable of reversible coupling and decoupling of stress transfer between successive layers of the plurality of constant stiffness material layers to provide a change in a bending stiffness of the variable stiffness structure; and
  c) each layer of the plurality of constant stiffness material layers comprising segmented planar sections arranged such that successive layers of the plurality of constant stiffness material layers comprise overlapping segmented portions, the segmented planar sections being separated by gaps so as to allow translation of segmented planar sections with respect to other segmented planar sections during bending of the variable stiffness structure when the plurality of variable modulus material layers are in a low modulus state.

* * * * *